(12) United States Patent
Kaiser

(10) Patent No.: US 9,314,136 B2
(45) Date of Patent: Apr. 19, 2016

(54) TIERED STACKING SYSTEM FOR PANS AND TRAYS

(71) Applicant: Benjamin Kaiser, Long Valley, NJ (US)

(72) Inventor: Benjamin Kaiser, Long Valley, NJ (US)

( * ) Notice: Subject to any disclaimer, the term of this patent is extended or adjusted under 35 U.S.C. 154(b) by 137 days.

(21) Appl. No.: 14/178,925

(22) Filed: Feb. 12, 2014

(65) Prior Publication Data

US 2015/0225186 A1    Aug. 13, 2015

(51) Int. Cl.
| | | |
|---|---|---|
| A47B 87/02 | (2006.01) |
| A47J 47/16 | (2006.01) |
| A21B 3/15 | (2006.01) |
| F24C 15/16 | (2006.01) |
| A47J 37/01 | (2006.01) |
| A47J 37/06 | (2006.01) |
| A47J 47/14 | (2006.01) |

(52) U.S. Cl.
CPC . *A47J 47/16* (2013.01); *A21B 3/15* (2013.01); *A47B 87/0223* (2013.01); *A47B 87/0246* (2013.01); *F24C 15/16* (2013.01); *A47B 87/0261* (2013.01); *A47J 37/01* (2013.01); *A47J 37/0641* (2013.01); *A47J 47/14* (2013.01)

(58) Field of Classification Search
CPC .............. A47B 87/02; A47B 87/0207; A47B 87/0223; A47B 2087/023; A47B 2087/0238; A47B 87/0246; A47B 87/0261; A47J 47/16
USPC .............. 211/126.2, 126.14, 126.16; 446/69; 248/558; 273/156, 157 R
See application file for complete search history.

(56) References Cited

U.S. PATENT DOCUMENTS

| | | | | |
|---|---|---|---|---|
| 595,455 A | * | 12/1897 | Glidden ................. | G09B 23/04 279/157 R |
| 1,154,136 A | * | 9/1915 | Simao ..................... | A63F 7/042 273/153 R |
| 1,328,921 A | * | 1/1920 | Howe ....................... | A63H 3/52 144/371 |
| 1,392,337 A | * | 10/1921 | Kay ......................... | A47F 5/112 248/174 |
| 1,781,063 A | * | 11/1930 | Jessen ..................... | E04G 25/06 248/354.4 |
| 1,875,141 A | | 8/1932 | Powell | |
| 2,187,355 A | * | 1/1940 | MacManus ............... | A21B 3/00 206/386 |
| 2,691,499 A | * | 10/1954 | Watts .................. | B65D 19/0012 108/51.3 |
| 2,917,187 A | * | 12/1959 | Bergkvist ............... | A47B 87/02 108/107 |
| 3,123,020 A | * | 3/1964 | Voissem ............. | B65D 19/0012 108/56.1 |
| 3,180,288 A | * | 4/1965 | McCowan ......... | A47B 87/0246 108/101 |
| 3,438,342 A | * | 4/1969 | Woolworth ........ | B65D 19/0028 108/158 |
| 3,480,154 A | * | 11/1969 | Telfer .................. | A47B 87/0261 108/91 |
| 3,664,271 A | * | 5/1972 | Wolder .............. | B65D 19/0012 108/57.1 |

(Continued)

FOREIGN PATENT DOCUMENTS

| | | | | |
|---|---|---|---|---|
| DE | 3322743 A1 | * | 1/1985 | ............. A47B 91/12 |
| FR | 2563609 A1 | * | 10/1985 | ............. A47B 91/12 |
| WO | WO 2013/183040 | * | 12/2013 | ............. A47B 7/02 |

*Primary Examiner* — Michael Safavi
(74) *Attorney, Agent, or Firm* — Thomas J. Germinario

(57) ABSTRACT

A set of plastic lifts are placed between sheet pans or trays in order to stack them within an oven and during cooling and transport. The dimensions of the plastic lifts are selected to provide adequate tray spacing for circulation of air between the trays for cooking and cooling purposes. Preferably, the plastic lifts comprise a set of four cylindrical lifts of 2½" height and eight cylindrical lifts of 1¼" height, with two of the smaller lifts nested within an axial bore of each of the larger lifts. The lifts are fabricated of a non-slide plastic material able to withstand temperatures up to 400° F. and capable of rapid cooling. The primary object is to achieve greater efficiency in domestic and commercial food preparation by heating and transporting multiple trays at the same time and enabling a more compact footprint for the trays.

4 Claims, 2 Drawing Sheets

(56) References Cited

U.S. PATENT DOCUMENTS

| | | | | | |
|---|---|---|---|---|---|
| 3,741,404 | A | * | 6/1973 | Jourdain | A47B 47/04 108/101 |
| 3,765,121 | A | * | 10/1973 | Vennola | A63H 33/00 273/157 R |
| 3,992,139 | A | * | 11/1976 | Lovatt | F27D 5/0006 34/239 |
| 4,074,810 | A | * | 2/1978 | Juergens | B42F 7/12 211/11 |
| 4,292,900 | A | * | 10/1981 | Bula | B65D 19/0012 108/57.1 |
| 4,437,668 | A | * | 3/1984 | Simpson | A63F 9/12 206/499 |
| 4,735,154 | A | * | 4/1988 | Hemery | B65D 19/0012 108/56.1 |
| 4,760,800 | A | * | 8/1988 | Hanson | A47B 81/002 108/152 |
| 5,054,629 | A | | 10/1991 | Breen | |
| 5,176,465 | A | * | 1/1993 | Holsted | A47B 87/02 108/56.3 |
| 5,197,396 | A | * | 3/1993 | Breezer | B65D 19/0012 108/56.1 |
| 5,298,098 | A | * | 3/1994 | Hoedl | B29C 65/0672 156/293 |
| 5,299,690 | A | | 4/1994 | Mund et al. | |
| 5,382,214 | A | * | 1/1995 | Mano | B31D 5/00 108/54.1 |
| 5,421,246 | A | * | 6/1995 | Tippmann | A23G 7/02 165/918 |
| 5,649,492 | A | * | 7/1997 | Chin-Shu | B65D 19/0051 108/51.3 |
| 5,667,379 | A | * | 9/1997 | Sporer | F27D 5/0006 432/241 |
| 5,672,412 | A | * | 9/1997 | Phares | B32B 3/28 108/51.3 |
| 5,695,205 | A | * | 12/1997 | Liu | A47B 87/0246 211/189 |
| 5,709,158 | A | * | 1/1998 | Wareheim | A47B 96/021 108/180 |
| 5,722,544 | A | * | 3/1998 | Williams | A47B 87/0246 108/107 |
| 5,894,944 | A | * | 4/1999 | Swift | A47G 23/08 211/128.1 |
| 6,224,453 | B1 | * | 5/2001 | McKinley, Jr. | A63H 33/04 446/117 |
| 6,681,684 | B1 | * | 1/2004 | Chen | A47G 19/02 206/509 |
| 6,752,678 | B1 | * | 6/2004 | Chuang | A63F 9/12 273/157 R |
| 6,892,991 | B1 | * | 5/2005 | Soh | A47B 91/02 16/32 |
| 6,948,435 | B1 | * | 9/2005 | Sheng | A47B 47/0016 108/180 |
| 6,968,583 | B1 | * | 11/2005 | Rich | A47C 19/024 248/188.2 |
| 7,028,853 | B1 | * | 4/2006 | Simms | A45D 8/00 211/126.2 |
| 7,384,264 | B2 | * | 6/2008 | Ego | B29C 70/34 108/190 |
| 8,646,740 | B1 | * | 2/2014 | Nelson | A47G 23/0306 215/393 |
| 8,887,646 | B2 | * | 11/2014 | Skudutis | B65D 19/0012 108/56.3 |
| 2003/0075083 | A1 | * | 4/2003 | Devey | A47B 87/0246 108/92 |
| 2003/0213718 | A1 | | 11/2003 | Ducharme et al. | |
| 2004/0084387 | A1 | * | 5/2004 | Chang | B42F 7/12 211/11 |
| 2005/0262789 | A1 | * | 12/2005 | Novoa | A47B 47/0041 52/473 |
| 2007/0175790 | A1 | | 8/2007 | Fernandez et al. | |
| 2007/0278170 | A1 | * | 12/2007 | Wiebe | A47B 87/0223 211/187 |
| 2008/0116156 | A1 | * | 5/2008 | Park | A47B 87/0207 211/59.2 |
| 2008/0142525 | A1 | | 6/2008 | Brouillette | |
| 2009/0107941 | A1 | * | 4/2009 | Liao | A47B 47/045 211/153 |
| 2009/0242501 | A1 | * | 10/2009 | Yankello | A47B 87/0246 211/153 |
| 2013/0055604 | A1 | * | 3/2013 | Herman Baran | A47B 45/00 40/606.03 |
| 2014/0054253 | A1 | * | 2/2014 | Reed | A47F 5/16 211/186 |
| 2014/0060398 | A1 | * | 3/2014 | Fakahany | A47B 87/0246 108/90 |
| 2015/0001169 | A1 | * | 1/2015 | Chen | A47B 87/0223 211/188 |

\* cited by examiner

TIERED STACKING SYSTEM FOR PANS AND TRAYS

FIELD OF INVENTION

The present invention relates to the field of pans and trays used in heating, handling, transporting and/or storing food items, and more particularly to the field of devices and methods used in stacking sheet pans and/or trays.

BACKGROUND OF THE INVENTION

In domestic and commercial food preparation, flat sheet pans or trays are commonly used to prepare and serve food items. It is advantageous for food preparers and caterers to be able to stack multiple pans and trays within an oven or cooling area so as to heat/cool more food within a given time period. Tiered stacking of pans and trays also maximizes the use of space during handling, transport and storage of prepared foods.

While several different stackable tray systems appear in the patent literature, these systems depend upon the use of specially designed trays having cooperating projections, ledges and/or flanges. Therefore, there is an unmet need for a system of tiered stacking that can be used with any kind of flat pan or tray.

SUMMARY OF THE INVENTION

The present invention comprises a set of plastic lifts that are placed between sheet pans or trays (hereinafter referred to collectively as "trays") in order to stack them within an oven and during cooling and transport. The dimensions of the plastic lifts are selected to provide adequate tray spacing for circulation of air between the trays for cooking and cooling purposes. Preferably, the plastic lifts comprise a set of four cylindrical lifts of 2½" height and eight cylindrical lifts of 1¼" height, with two of the smaller lifts nested within an axial bore of each of the larger lifts. The lifts are fabricated of a non-slide plastic material able to withstand temperatures up to 400° F. and capable of rapid cooling. The primary object of this invention is to achieve greater efficiency in domestic and commercial food preparation by heating and transporting multiple trays at the same time and enabling a more compact footprint for the trays.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
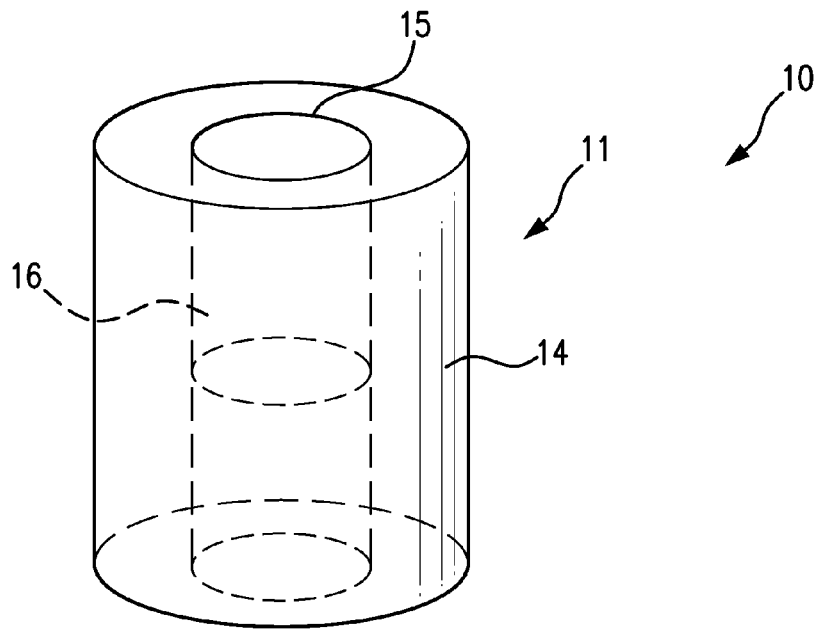
FIG. 1 is a perspective view of a larger cylindrical stacking lift, showing an axial bore containing two smaller cylindrical stacking lifts, in accordance with the preferred embodiment of the present invention.
Figure 2:
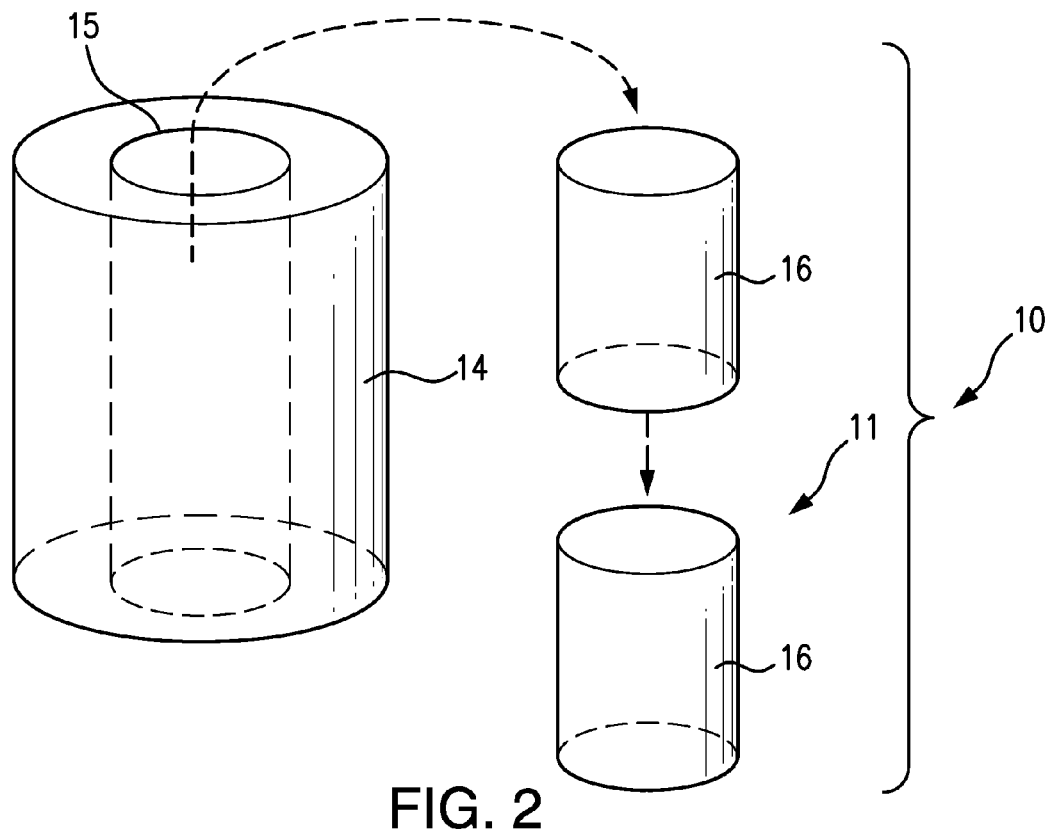
FIG. 2 is an exploded view of the larger cylindrical stacking lift of FIG. 1, with the two smaller cylindrical stacking lifts removed to the exterior of the axial bore, in accordance with the preferred embodiment of the present invention.
Figure 3:
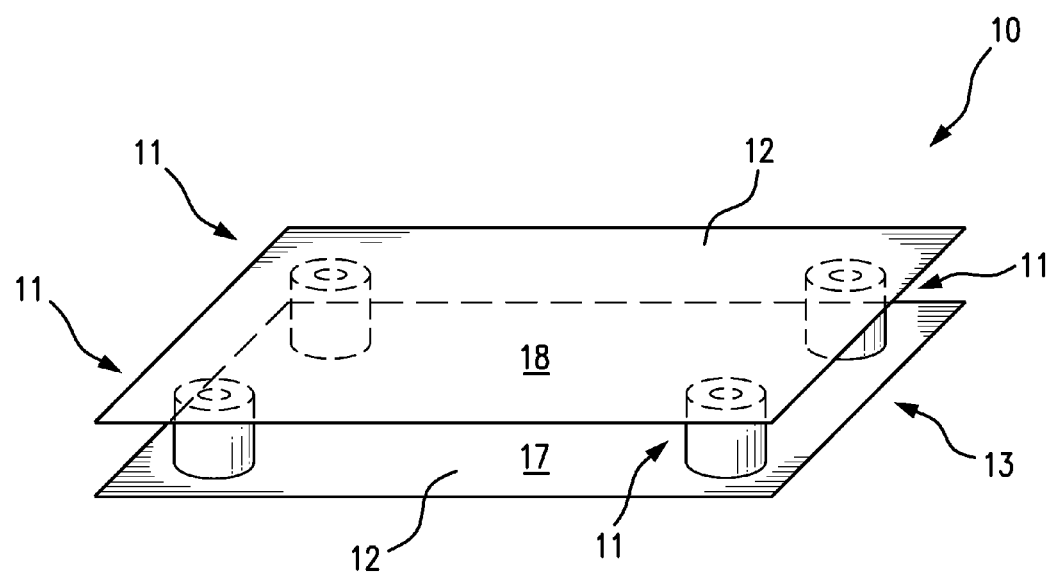
FIG. 3 is a perspective view of two tiered sheet trays, which are separated by four cylindrical stacking lifts, in accordance with the preferred embodiment of the present invention.

Referring to FIGS. 1-3, the preferred embodiment of the present invention 10 comprises a set of cylindrical stacking lifts 11, which are insertable between substantially flat sheet pans or trays 12 so as to stack them in a horizontally-tiered, parallel-spaced relationship 13.

Preferably, each set of lifts 11 comprises four larger cylindrical stacking lifts 14, each having an axial bore 15, within which can be nested two mutually congruent smaller cylindrical stacking lifts 16. The dimensions of the larger and smaller stacking lifts 14 16 are selected to provide a range of tiered tray spacing 13 for various food heating and cooling situations. In one embodiment, the lifts 11 comprise a set of four larger lifts 14, each 2½ inches in height, and eight smaller lifts 16, each 1¼ inches in height, such that two of the smaller lifts 16 are nestable within a 1¼-inch diameter axial bore 15 of each of the larger lifts 14, as depicted in FIGS. 1 and 2.

Preferably, the lifts 11 are fabricated of a non-slide plastic material, such a food grade silicone, able to withstand oven temperatures up to 400° F. and capable of rapid cooling.

As illustrated in FIG. 3, the lifts 11 are used to stack flat sheet pans or trays 12 by placing a lift 11 at each corner of a base tray 17, and then placing a first tier tray 18 on top of the lifts 11, such that the first tier tray 18 is supported by the lifts 11 and is aligned with the base tray 17 in a horizontally tiered, parallel-spaced relationship 13. Furthering tiering can then be accomplished by placing a lift 11 at each corner of the first tier tray 18, and then placing a second tier tray (not shown) on top of the lifts 11, such that the second tier tray is supported by the lifts 11 and is aligned with the first tier tray 18 in a horizontally-tiered, parallel-spaced relationship 13. This same process can be repeated to support third, fourth and subsequent tier levels.

The selection of either the larger lifts 14 or the smaller lifts 16 for each tier level is based upon the size and shape of the food items on the lower tray and on the clearance required for adequate air circulation.

It is to be understood that, although the preferred embodiment of the present invention 10 have been illustrated using cylindrical lifts 11, the lifts 11 can have the shape of any three-dimensional solid having at least two opposite parallel faces, such as a cube, a cuboid, a prism, or a frustum. Also, it should be understood that, while the preferred embodiment of the present invention 10 has been shown in FIG. 3 with trays 12 of the same size and shape, this stacking system can be applied to the tiering of trays having different sizes and/or shapes.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

In the claims which follow, to avoid repetition, sheet pans and trays are collectively referred to simply as "trays."

What is claimed is:

1. An apparatus for removably stacking two or more substantially flat trays in a horizontally-tiered, parallel-spaced relationship, the apparatus comprising:

two or more mutually congruent larger stacking lifts, wherein each larger stacking lift consists of a three-dimensional solid, having an upper surface which is parallel to a lower surface, and wherein each larger stacking lift has a larger stacking lift height, and wherein each larger stacking lift has a central bore, and wherein the central bore is axially disposed between the upper surface and the lower surface of the larger stacking lift;

for each larger stacking lift, two smaller stacking lifts, wherein each smaller stacking lift consists of a three-dimensional solid, conforming to the shape of central bore of the larger stacking lift and having a top surface which is parallel to a bottom surface, and wherein each smaller stacking lift has a smaller stacking lift height which is one-half the larger stacking lift height, and wherein any two of the smaller stacking lifts are configured to be removably inserted and nested, one above the other, entirely within the central bore of any of the larger stacking lifts.

2. The apparatus of claim 1, wherein each of the larger stacking lifts has a cylindrical shape with a circular cross-section, and wherein the central bore of each of the larger stacking lifts has a cylindrical shape with a coaxial circular cross-section.

3. The apparatus of claim 2, wherein each of the smaller stacking lifts has a cylindrical shape with a circular cross-section which is congruent with the circular cross-section of the central bore of the larger stacking lifts.

4. The apparatus of claim 3, wherein the larger stacking lifts and the smaller stacking lifts are made of a material capable of withstanding temperatures up to 400° F. without melting or deforming.

\* \* \* \* \*